April 17, 1951     F. F. DAUENHAUER     2,549,061
MACHINE FOR SHAPING WIRE STRANDS FOR SCREENS
Filed Aug. 22, 1947     8 Sheets-Sheet 3

INVENTOR.
FLORIAN F. DAUENHAUER.
BY
Munn, Liddy & Glaccum
ATTORNEYS.

April 17, 1951 F. F. DAUENHAUER 2,549,061
MACHINE FOR SHAPING WIRE STRANDS FOR SCREENS
Filed Aug. 22, 1947 8 Sheets-Sheet 5

INVENTOR.
FLORIAN F. DAUENHAUER.
BY
Murry, Liddy & Glaccum
ATTORNEYS.

April 17, 1951   F. F. DAUENHAUER   2,549,061
MACHINE FOR SHAPING WIRE STRANDS FOR SCREENS
Filed Aug. 22, 1947   8 Sheets-Sheet 6

INVENTOR.
FLORIAN F. DAUENHAUER.
BY
Munn, Liddy & Glaccum
ATTORNEYS.

April 17, 1951     F. F. DAUENHAUER     2,549,061
MACHINE FOR SHAPING WIRE STRANDS FOR SCREENS
Filed Aug. 22, 1947     8 Sheets-Sheet 8

INVENTOR.
FLORIAN F. DAUENHAUER
BY
ATTORNEYS.

Patented Apr. 17, 1951

2,549,061

UNITED STATES PATENT OFFICE 2,549,061

MACHINE FOR SHAPING WIRE STRANDS FOR SCREENS

Florian F. Dauenhauer, Santa Rosa, Calif.

Application August 22, 1947, Serial No. 770,057

16 Claims. (Cl. 140—71)

An object of my invention is to provide a machine for shaping wire strands for screens which is especially designed to shape the wire strands used in making the screen type conveyor shown in my copending application Serial No. 575,374, now abandoned, filed January 31, 1945. The type of screen conveyor disclosed in my copending case has a flat mesh which will flex in one direction, but will not flex in the opposite direction.

A further object of my invention is to provide a machine for shaping wire strands for screens which will automatically feed and bend a wire into the desired shape to form a strand of the screen. The loop-shaped strand can be of any length desired to make a screen of the desired dimensions. The screen made from the strands can be stationary or it can be formed into an endless belt and be carried by drums.

Other objects and advantages will appear in the following specification, and the novel features of the device will be particularly pointed out in the appended claims.

My invention is illustrated in the accompanying drawings forming a part of this application, in which.

While I have shown only the preferred form of my invention, it should be understood that various changes or modifications may be made within the scope of the appended claims without departing from the spirit and scope of the invention.

In carrying out my invention, I provide a frame A with a top B on which the wire-shaping dies for forming the reverse loops are mounted. The crimping means for the alternate loops is also carried by the top. I will first describe the connections between the source of power and the main crank shaft, and then will successively describe the various dies and associate mechanisms for acting on the wire strand to form it into the desired shape, and this will be followed by a brief description of the operation of the entire machine.

Drive connections for the main shaft

Reference to Figures 1, 2, 5 and 6 illustrates a motor C connected to a large pulley 1 by a belt 2. The pulley is mounted on a countershaft 3 to which a small pulley 4 is secured, see Figure 5. Connections between a main crank shaft 5 and the pulley 4 is effected by a belt 6 and a large pulley 7 mounted on the crankshaft. Bearings 8' support the crankshaft on the top B. Any source of power may be used and any means for connecting the crankshaft to the power source may be resorted to. I will now describe the means for receiving the wire from which the looped and crimped wire strand is formed.

Wire-receiving and forming dies

Figure 7:
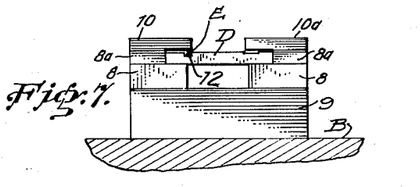
Figure 7 is an enlarged transverse section, taken along the line VII—VII of Figure 2.
Figure 8:
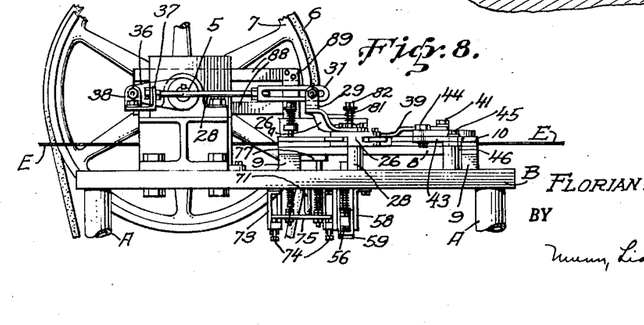
Figure 8 is a side elevation of a portion of the machine when looking at the opposite side to that shown in Figure 1.
Figure 25:
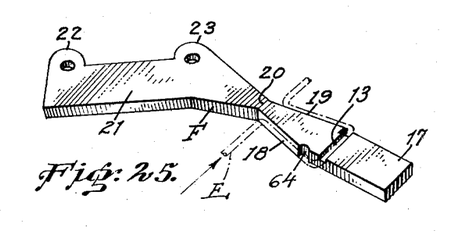
Figure 25 is a perspective view of a wire-forming die when looking in the direction of the arrow XXV in Figure 21.

Figures 9, 17, 18 and 20 illustrate a longitudinal section and illustrate the top B carrying three parallel guide plates 8 contacting each other and positioned above the top by end blocks 9. Guide strips 8a are carried by the two outer plates 8. An end die D is slidable on the guide plates 8 and between the strips 8a and is held against removal by retaining strips 10 and 10a, see Figure 7. The end die has an inclined wire-shaping edge 11 for cooperating with a loop-forming die F in a manner hereinafter described. The end die D has a longitudinally extending wire-receiving groove 12 in its upper surface and underlying the retaining strip 10 as clearly shown in Figure 7. A wire E is fed along the groove 12 and Figure 27 shows the wire extending across the transversely disposed loop-forming die F and being received in a groove 13 provided in the die, see also the perspective view of the die F in Figure 25.

Figure 27:
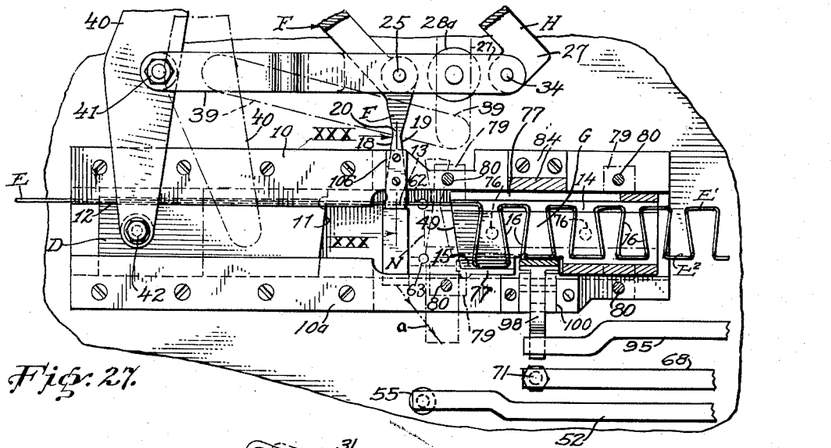
Figure 27 is a top plan view of a machine portion showing the forming die, with the pulling die and housing removed.

A wire strand holding member G is placed to the right of the loop-forming die F in Figure 27. A wire-stripping block 77 is associated with member G and has longitudinally extending grooves 14 and 15 therein for receiving the looped ends E1 and E2 of the completed wire which will be explained hereinafter more fully. Initially, the end of the wire E is placed in the groove 14 so that at the start of the wire-forming operation, the wire will be received in aligned grooves 12, 13 and 14 provided in the end die D, the transverse die F and the wire-stripping block respectively. This is clearly shown in Figure 27. The member G has transversely extending wire-receiving grooves 16 that are inclined with respect to each other in the manner shown in Figure 27.

Wire loop-forming die F

Figure 2:
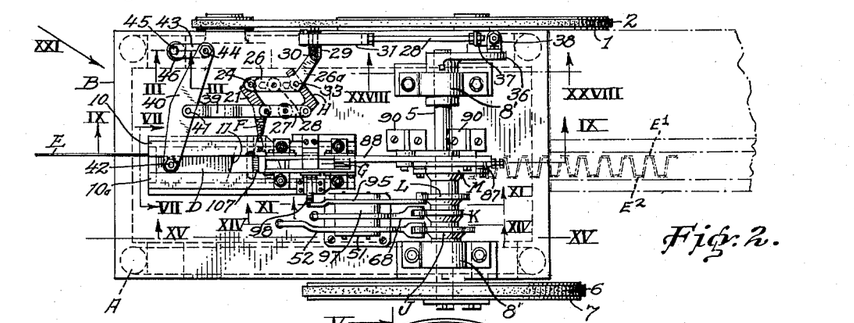
Figure 2 is a top plan view.
Figure 5:
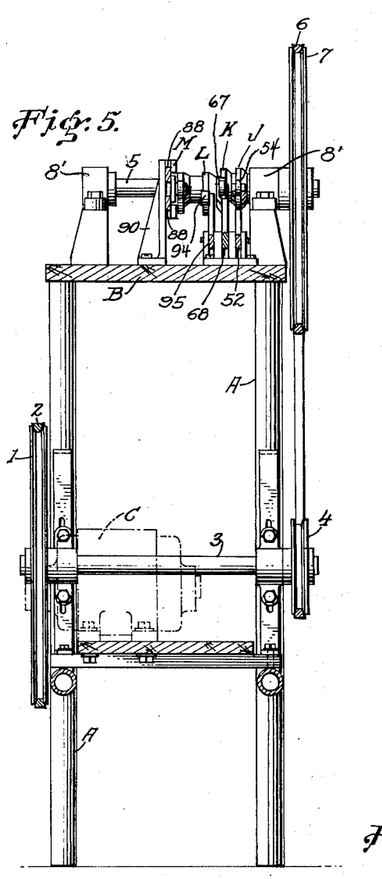
Figure 5 is an enlarged transverse section taken substantially along the line V—V of Figure 1.
Figure 6:
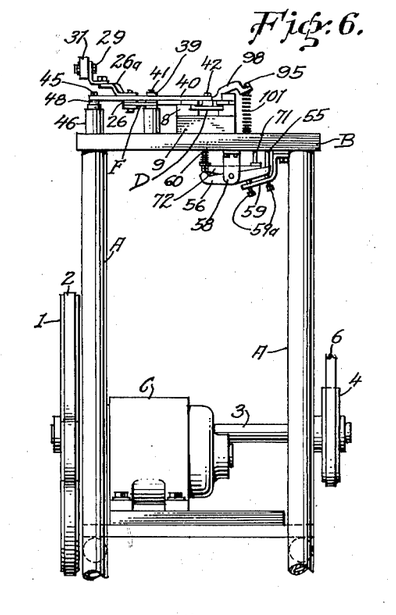
Figure 6 is an enlarged end elevation when looking at the left hand end of Figure 1.

It is best at this time to describe the operation of the wire loop-forming die F. The die is shown in perspective in Figure 25 and it has a tongue 17 extending beyond the transverse groove 13 and inclined wire-shaping sides 18 and 19 extending from the neck 20 of the die to the groove 13. The die has a head portion 21 inclined with respect to the neck 20 and having two ears 22 and 23 provided with openings therein. Referring to Figure 2, it will be seen that the head 21 forms one side of a pantograph indicated generally at H. The perforated ears 22 and 23 receive pins 24 and 25, see also Figure 33, that pivotally secure the head to levers 26 and 27 which in turn are pivotally secured to the top B at 28b and 28a respectively. The lever 26 has inclined an arm 26a that is integral therewith and has its free end slidably connected to a pitman 28, see Figure 33, by a clevis 29 pivoted to the arm 26a at 30 and carrying a bolt 29a slidably received in a slotted guide 31, carried by the pitman 28.

A link 32 is pivoted to the levers 26 and 27 at 33 and 34 and completes the formation of the pantograph. The lever 26 is adjustable as to length between the pivot points 24 and 33 for altering the movement of the forming die F caused by the pantograph. Adjusting bolts 35 are tightened after the lever 26 is corrected to the desired length. The lever 26 is in two sections and the bolts 35 secure these together as a unit. The pitman 28 is operatively connected to a crank-arm 36 by a double clevis 37 which is pivoted at 38 to the arm. Figure 2 shows the crank-arm 36 connected to the crank-shaft 5 so as to be rotated thereby and the pitman will swing the pantograph H from the position shown in this figure into the one shown in Figure 33.

It is necessary to maintain the axis of the die tongue 17 at right angles to the longitudinal travel of the end Die D at all times and I accomplish this by connecting one end of a link 39 to the pivot point 25 of the pantograph H and the other end to a lever 40 at 41. The lever 40 is also used for reciprocating the end die D and is pivotally connected thereto by a bolt 42 which is carried by the die D and is slidably received in a slot provided in the lever. The lever 40 is pivoted to an arm 43 at 44 and Figures 3 and 4 illustrate how the arm can be altered in its position.

Figures 1, 3, 4:
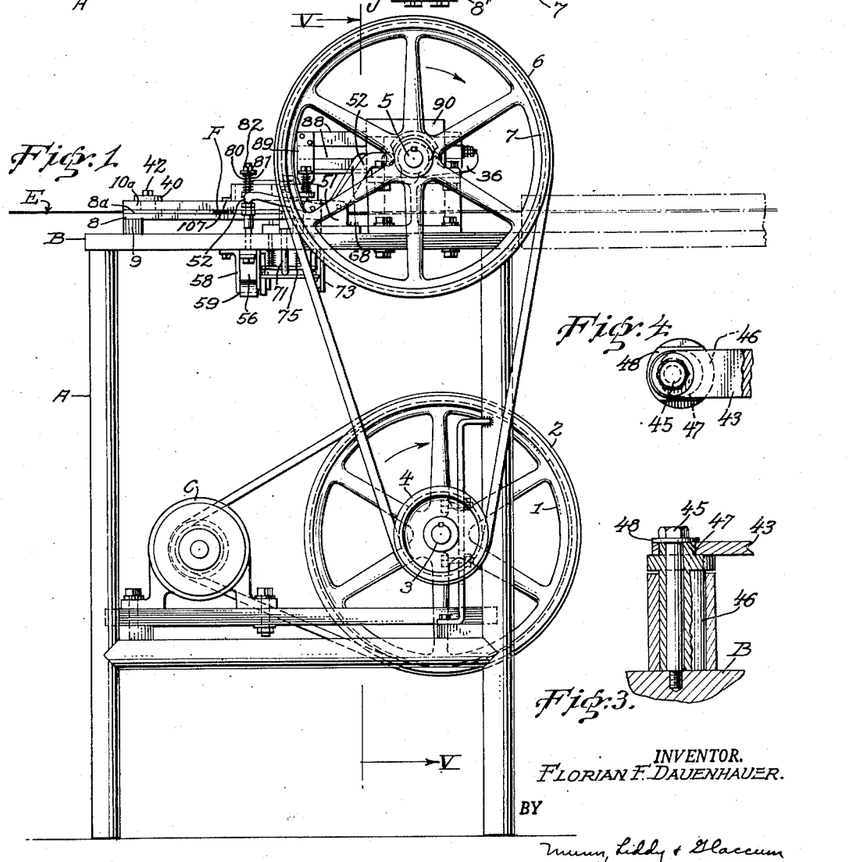
Figure 1 is a side elevation of the machine.
Figure 3 is an enlarged transverse section of an adjusting means for the wire forming die.
Figure 4 is a top plan view of Figure 3.

Referring to Figure 3 it will be seen that a cap screw 45 holds an eccentric sleeve 46 to the top B and the sleeve has an eccentric portion 47 received in an opening in the arm 43. The sleeve may be rotated on the cap screw to rotate the eccentric 47 for adjusting the arm. The cap screw may then be tightened for holding the eccentric in the desired position. This changes the pivot point 44. A disc 48 is placed over the arm 43 to hold it in place. Any other adjustment for the arm 43 may be used if desired. The adjustment of the pivot point 44 and the adjustment of the distance between the pivot points 24 and 33 of the pantograph H, alters the movement of the transverse die F so that it will move transversely when the crank-shaft is rotated and will maintain its axis at right angles to the longitudinal axis of the end die D, during this movement.

Figures 36, 37, 38:
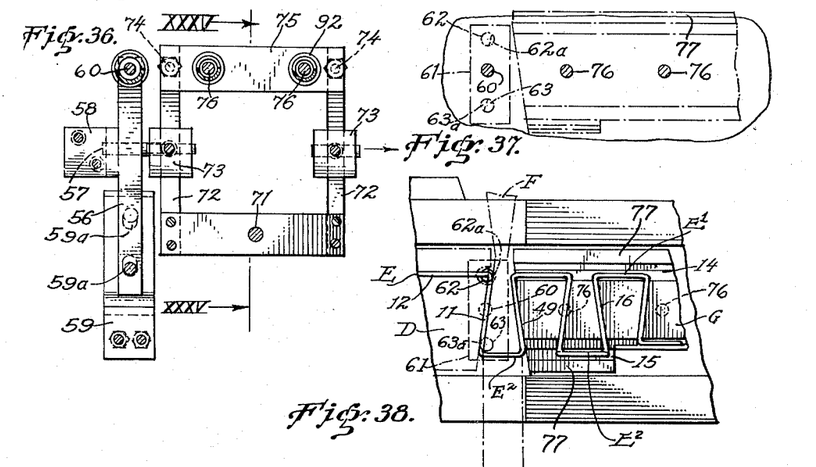
Figure 36 is a horizontal section taken along the line XXXVI—XXXVI of Figure 35 just under the top.
Figure 37 is a horizontal section taken along the line XXXVII—XXXVII of Figure 35, along the upper surface of the machine top.
Figure 38 is a top plan view of the wire-receiving die after the loop has been formed in the wire strand.

Figure 38 shows in enlarged detail the wire strand holding member G with an inclined wire-shaping edge 49. Figure 27 illustrates the starting position of the transverse die F in full lines and the final position of the die in dot dash lines. The arrowed line $a$ in this figure shows how the die travels to the right and down. By the time the die F reaches the dot dash line position of Figure 27, the end die D will have its wire-shaping edge 11 forcing a portion of the wire E against the wire-shaping side 18 of the die F, and the wire-shaping side 19 of the die F will be forcing another portion of the wire against the edge 49 of the member G. Figure 38 shows the completed transaction with the die F in dot dash lines and at the end of its stroke and the wire E formed between the ends 11 and 49 of the member G and the sides 18 and 19 of the die.

Figures 21, 23, 24, 26, 40:
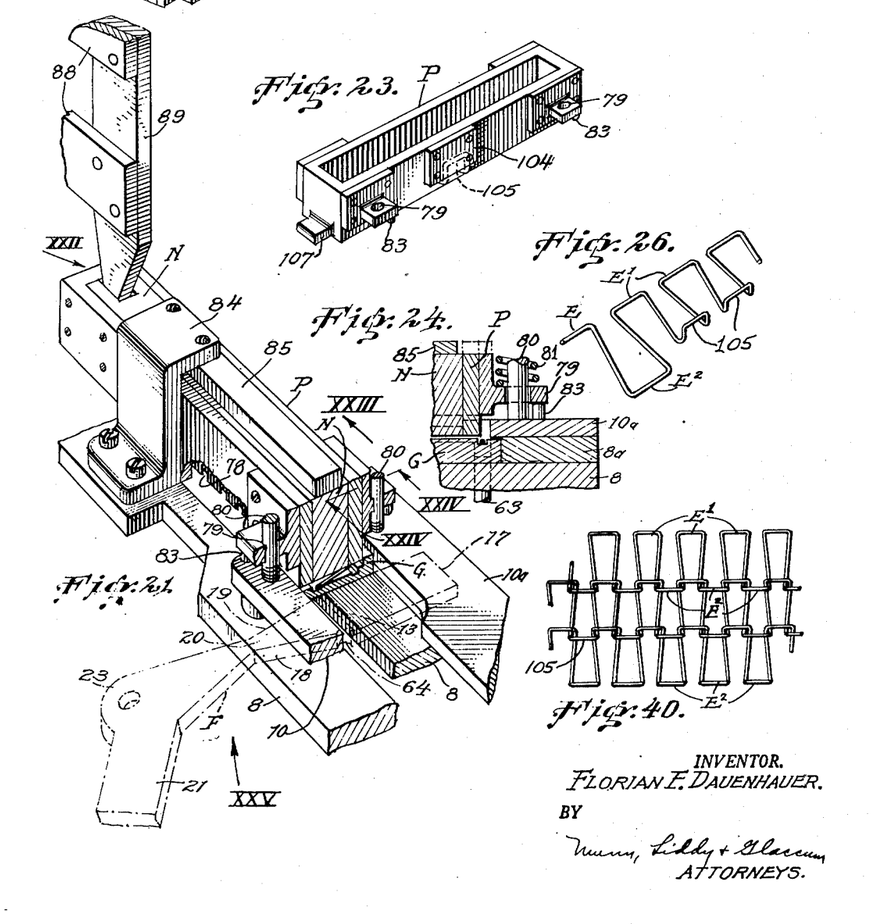
Figure 21 is an enlarged perspective view of the wire strand pulling die assembly when looking in the direction of the arrow XXI in Figure 2.
Figure 23 is a perspective view of the pulling die housing when looking in the direction of the arrow XXIII in Figure 21.
Figure 24 is a transverse section taken along the line XXIV—XXIV of Figure 21, showing the vertical guide rod and stops for the pulling die housing.
Figure 26 is a perspective view of a portion of a wire strand and illustrates the progressive steps of shaping and crimping of the loops.
Figure 40 is a plan view of a wire screen made from a plurality of the preformed wire strands.

The wedge-shaped loop $E^2$ is formed and this is shown in Figure 26. The sides of the loop diverge from each other from the open to the closed end of the loop. The closed end of the lop is formed by the groove 13 in the die F. As the loop-forming step is repeated, the wire strand is intermittently advanced by a means presently to be described and this causes the loops $E^1$ to be formed and to extend opposite to the loops $E^2$. In fact the inclined sides of the loop $E^2$ form the inclined sides of the adjacent loops $E^1$. The movement of the die F is not only timed with movement of the end die D so that a loop in the wire will be formed, but the die F will remain in its advanced position long enough to permit the loop $E^2$ to be raised off from the die by a mechanism now to be described.

*Means for stripping loop $E^2$ from forming die F*

Figure 2 shows the crank-shaft 5 provided with four cams. The cam J is disposed nearest the large pulley 7 and operates a mechanism to lift the formed wire loop $E^2$ above the die F, preparatory to moving the formed wire strand to the right. I refer to the cam J as the wire strand removing cam for the die F. Next to the cam J I place cam K for actuating a mechanism for stripping the formed wire strand from the holding member G preparatory to moving the strand to the next position.

A cam L is placed next to the cam K and actuates a mechanism for forming a crimp in the closed end of the loop $E^2$, this crimp being clearly shown in Figure 26. The fourth cam is indicated at M and actuates a wire strand pulling mechanism for moving the completed wire strand, stepwise along the wire strand holding member G. All of these four cams operate in proper order and are timed with the pantograph actuating mechanism so that a wire strand having reversely extending loops, is formed, all of the loops extending in one direction being crimped while those extending in the opposite direction are not crimped. The completed wire strand is shown in Figure 26 excepting that the left hand loop $E^2$ has yet to be crimped. Figure 40 shows a number of the wire strands having their crimped loops $E^2$ interconnected with the uncrimped loops $E^1$ of the adjacent strand to form a screen.

Figures 15, 16, 17, 18, 19, 20:
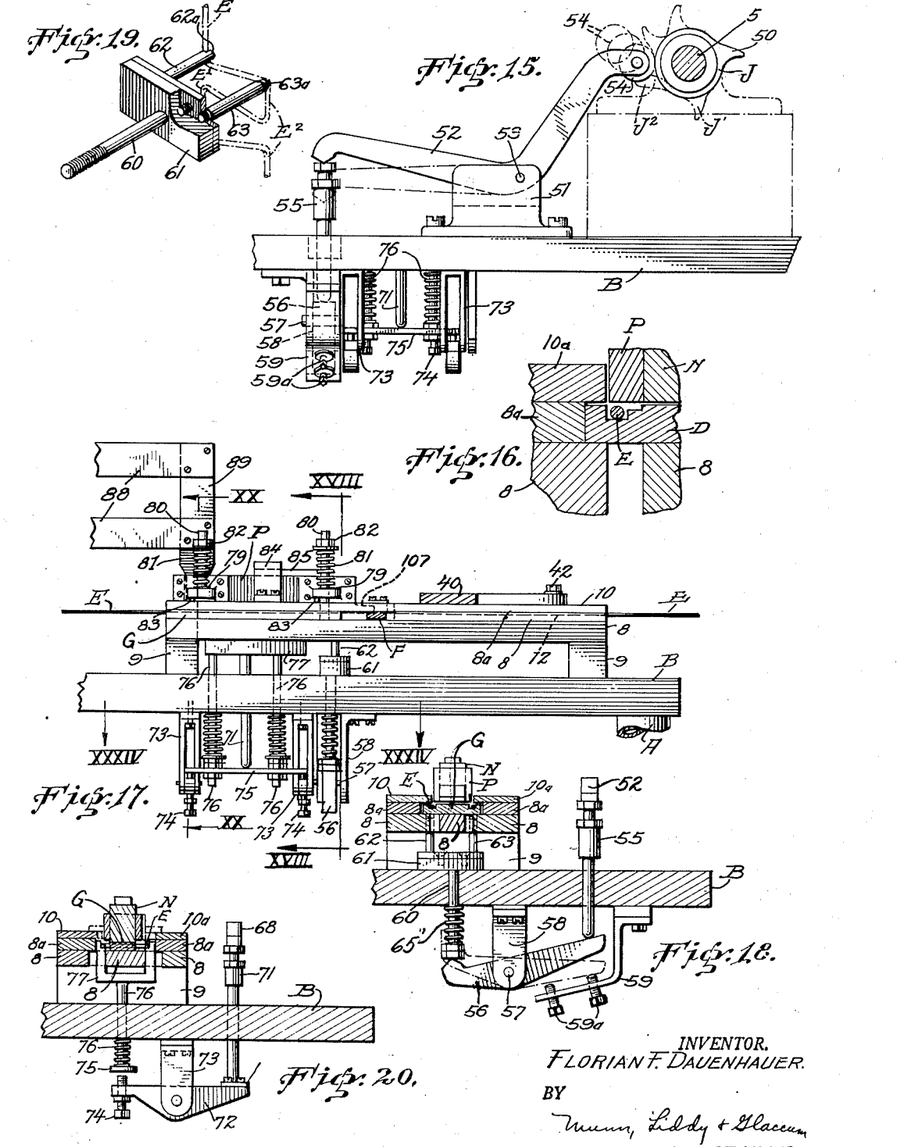
Figure 15 is an enlarged longitudinal section taken along the line XV—XV of Figure 2, and illustrates the cam that actuates the forward stripping block for removing the wire strand from the forming dies.
Figure 16 is an enlarged transverse section taken along the line XVI—XVI of Figure 9, and illustrates the guide block.
Figure 17 is a portion of Figure 8 enlarged and shows the mechanism for removing the wire from the die.
Figure 18 is a transverse section taken along the line XVIII—XVIII of Figure 17.
Figure 19 is a perspective view of the wire removing pins and lifting bar shown in a horizontal position for clarity although they are vertically arranged in the machine.
Figure 20 is a transverse section taken along the line XX—XX of Figure 17.

The wire loop stripping cam J is illustrated in detail in Figures 15, 18, 19 and 39. Referring to Figure 15, it will be seen that the crank-shaft 5 supports the cam and the cam is provided with a high point which is tooth-shaped as at 50. A bracket 51 pivotally supports a lever 52 at 53 and a cam-following roller 54 is shown contacting with the low portion of the cam in Figure 15. The tooth or high portion 50 of the cam is removed substantially 180° away from the roller 54 as indicated in this figure for the purpose of giving the loop forming die F an opportunity to form the loop $E^2$ which requires about 180° of rotation of the shaft 5.

A plunger 55 extends through the top B and Figure 18 shows this plunger contacting a rocker arm 56 that is pivotally mounted at 57 to a bracket 58, the latter being suspended from the underside of the top B. A bracket 59 with adjustable stops 59a limits the clockwise swing of the rocker arm 56 caused by the plunger 55.

Figures 28, 29:
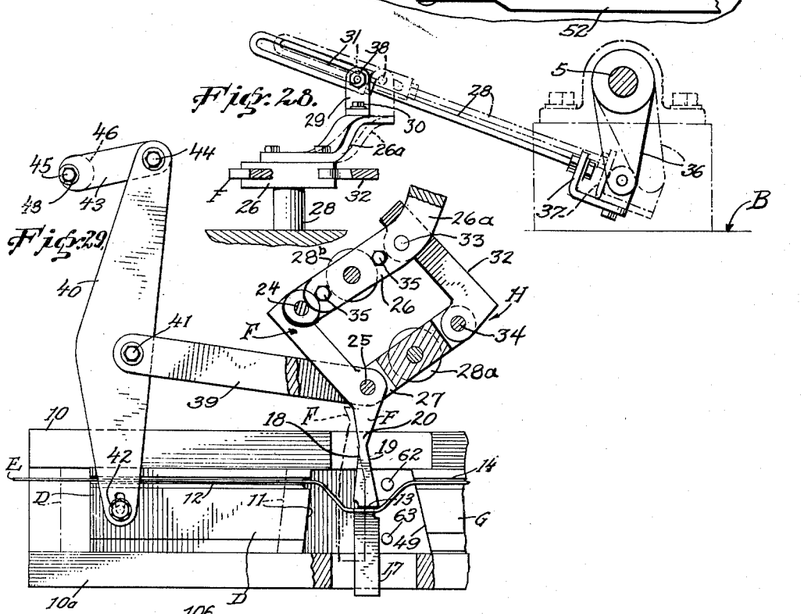
Figure 28 is an enlarged longitudinal section taken along the line XXVIII—XXVIII of Figure 2, with the crank shaft rotated 90° from its starting position.
Figure 29 is a plan view of the pantograph for moving the wire-forming die and illustrates its position when the crank shaft has rotated through 90°, i. e., the same position as shown in Figure 28.

When the crank 5 rotates through an arc of 90° from its starting position, the cam roller 54 will still be travelling on the low portion of the cam. The 90° position of the cam J is shown by the dotted lines in Figure 15 and is indicated by $J^1$. During this 90° rotation of the crank-shaft, the pantograph H has advanced the transversely moveable die F to the position shown in Figure 29 and the wire E has a portion started to be formed into the loop $E^2$. The end die D is also shown advanced toward the loop-forming die F.

Figure 33:
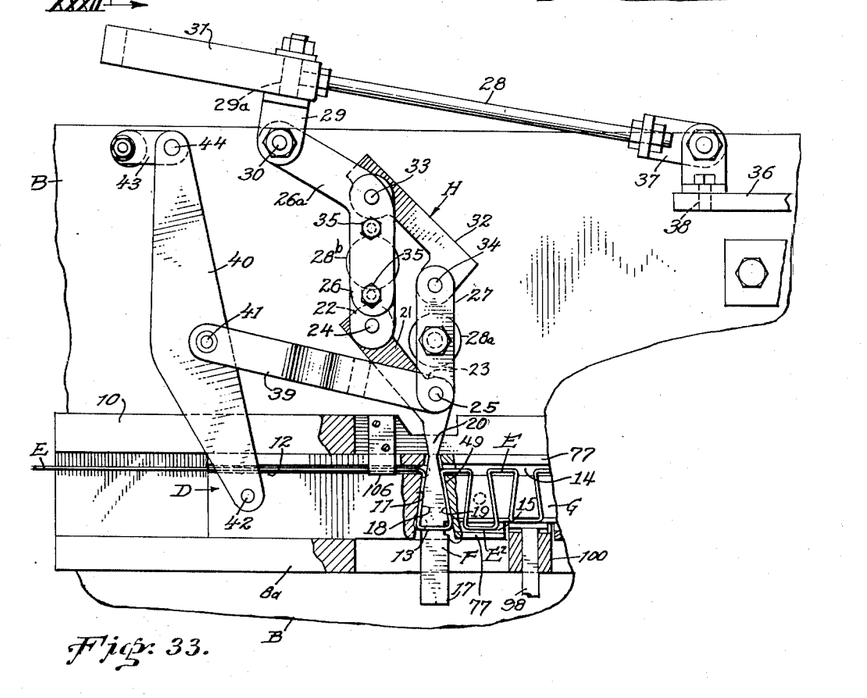
Figure 33 is a plan view of the pantograph and associate mechanism illustrating its position after the crank shaft has rotated 180° from its starting position, the forming of the wire loop in the strand being completed.

The next position of the cam J in Figure 15 shows it contacting the roller 54 and ready to swing the lever 52 into the dotted line position. The 170° position of the cam J from its starting position is indicated by $J^2$. Figure 33 indicates how the die F has completed its wire loop-forming stroke when the crank-shaft has rotated about 170° from its starting position. The slotted guide 31 on the pitman 28 will permit the pantograph and die F as well as the die D, to remain in their moved position for the next 90° rotation of the crank-shaft. It is during this lost motion period of the dies D and F that the wire stripping cam J actuates the lever 52.

The cam J starts to rock the lever 52 when the cam is rotated about 170° past its starting position. At the 170° position, the loop forming die F will have completed its stroke in one direction to form the loop $E^2$ and the end die D will have completed its stroke into abutting relation with the die F so that the edge 11 of the die D and the side 18 of the die F will form the inclined side of the wire loop. A rotation of the crank-shaft 5 from the 170° position to the 195° position will take place to cause the cam J to actuate its wire loop mechanism which will now be described. The action is fast because it must be completed while the die F is in its loop forming position.

Figure 18 shows the lever 52 moving the plunger 55 downwardly. The plunger 55 acts on the rocker arm 56 that contacts with a spring-pressed plunger 60 when the plunger 55 is depressed. A perspective view of the plunger 60 is illustrated in Figure 19. The plunger is shown in a horizon-position in this figure for clarity purposes although in reality the plunger is vertically disposed.

The plunger 60 supports a base 61 above the top B, the base being moveable between the upper surface of the top and the under surface of the guide plates 8, see Figure 18. The base 61 supports pins 62 and 63. Figure 38 illustrates how the top of the pin 62 is recessed at 62a to provide a shoulder that will lift the wire loop E1 when the pin is lifted. The other pin 63 is recessed at 63a to receive the closed portion of the wire loop E2 and the shoulder provided on the pin will lift the loop clear of the die F when the pin is lifted. The loop forming die F is recessed at 64, see Figure 25, to receive the pin 63 when the die is at the limit of its stroke and before it starts on its return movement. The two pins 62 and 63 lift the loop E2 from the die F before the die starts on its return movement.

Figure 39:
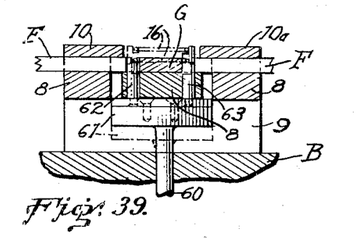
Figure 39 is a view similar to Figure 18 with the wire removing pins lifting the wire clear of the forming die.

Figure 39 indicates the full upward movement of the spring-pressed plunger 60. The spring 65' of the plunger 60, see Figure 18, is compressed when the pins 62 and 63 are in their raised position. The loop E2 will be raised out of the groove 13 in the die F. The pins will be returned to their normal position by the spring 65 as soon as the roller 54 rides over the high point 50 of the cam J. Both the wire loop E2 and the pins 62 and 63 will be freed from the die F before the die starts on its return movement.

*Means for stripping wire from holding member G*

At about the time the cam J permits the stripping pins 62 and 63 to return to normal position, the cam K comes into action for stripping the wire strand from the holding member G. This cam and its associate mechanism is illustrated in Figures 14, 20, 34, 35 and 36. The cam is mounted on the crank shaft 5 and has a high portion 65 and a low portion 66 on which a cam roller 67 rides. The roller is carried by a lever 68 which is pivoted at 69 to a bracket 70 that is mounted on the top B. When the machine is in its starting position with the parts as shown in Figure 2, the cam K will be in the full line position illustrated in Figure 14. The cam roller 67 will have just left the high portion 65 of the cam and will have started on its travel over the low portion 66 that extends through an arc greater than 180°.

Figures 9, 10, 11, 12, 13, 14:
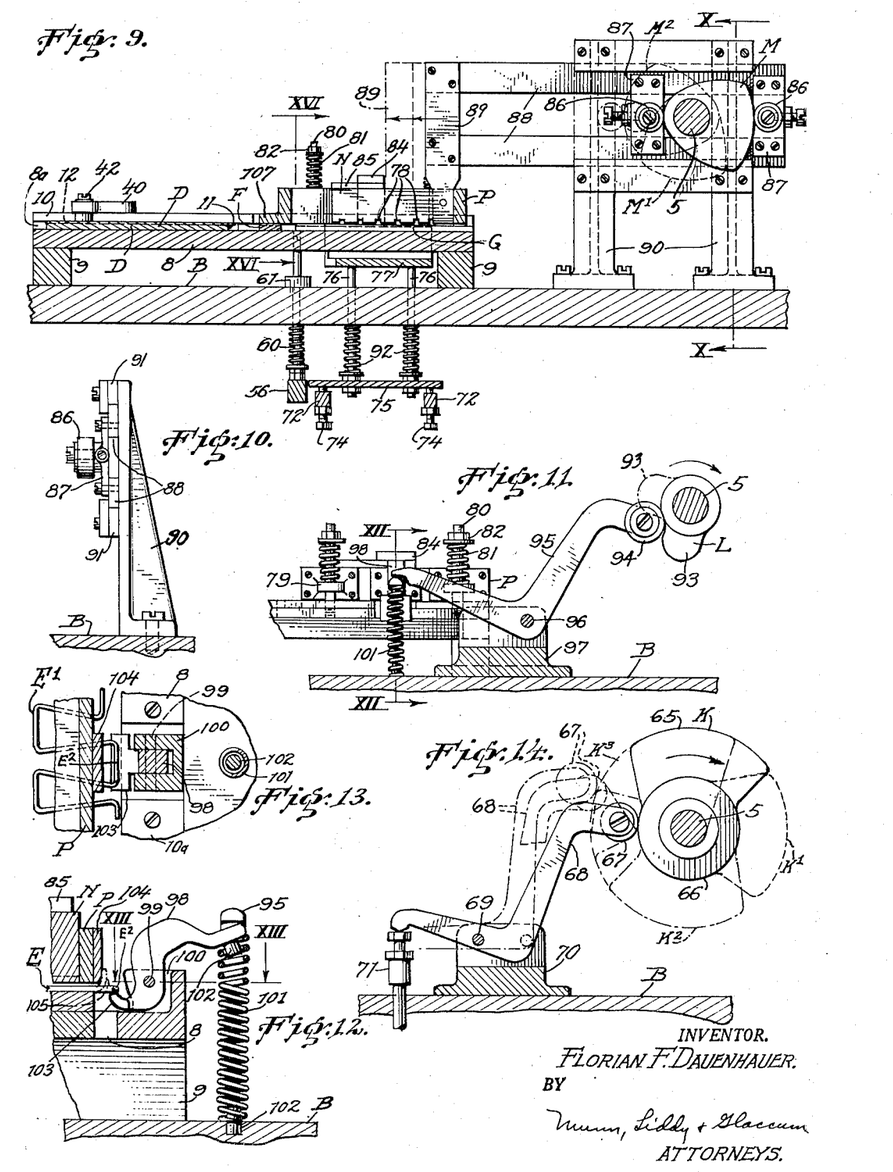
Figure 9 is an enlarged longitudinal section taken along the line IX—IX of Figure 2, and illustrates the cam for moving the wire strand pulling block.
Figure 10 is a transverse section taken along the line X—X of Figure 9, and illustrates the cam follower for the strand pulling block.
Figure 11 is an enlarged longitudinal section taken along the line XI—XI of Figure 2, and shows the cam and associate mechanism for crimping the wire.
Figure 12 is a transverse section taken along the line XII—XII of Figure 11.
Figure 13 is a horizontal section taken along the line XIII—XIII of Figure 12.
Figure 14 is an enlarged longitudinal section taken along the line XIV—XIV of Figure 2, and illustrates the cam for operating the stripping pins that remove the wire strand from the forming dies.

When the crank shaft 5 rotates through an arc of 90°, the roller will still be on the low portion. The 90° position of the cam is indicated at K1. The next 90° position or 180° from the starting point is indicated by K2. The cam is about ready to swing the lever 68 and this takes place when the cam reaches the 200° position. The lever 68 presses downwardly on a plunger 71 that is slidably carried by the top B. Figure 20 illustrates the plunger actuating a dual rocker arm 72 that is pivotally carried by brackets 73, see Figure 36, which are suspended from the top B. The other ends of the rocker arms carry adjusting screws 74 which contact with a cross bar 75 that is connected to two spring-pressed plungers 76.

Figure 35:
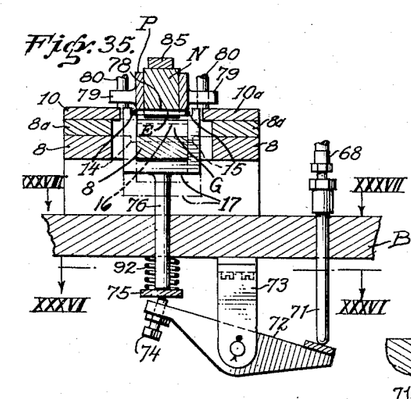
Figure 35 is a section taken along the line XXXV—XXXV of Figure 36 and is similar to Figure 20, but shows the die-stripping block starting to engage wire strand for removing it from the die.

The tops of the two plungers 76 support a wire stripping block 77 of the length shown in Figure 9 and the block is U-shaped in cross section as shown in Figure 35. The sides of the block extend up between the guide plates 8 and straddle the wire holding member G. The portion of the center guide plate which is received between the parallel walls of the block is transversely grooved at 16. The longitudinal grooves 14 and 15 also previously mentioned are formed in the top edges of the parallel sides of the block 77 and when the block is in its normal position, the grooves 14 and 15 lie in the same plane as the grooves 16.

Figure 22:
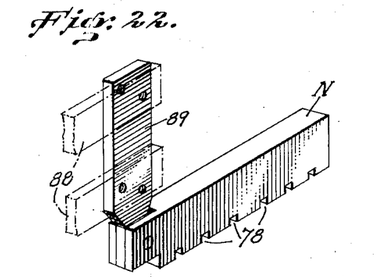
Figure 22 is a perspective view of the pulling die for the wire strand when looking in the direction of the arrow XXII in Figure 21.

The raising of the block 77 by the cam K removes the wire from the grooves 16 and moves it into the transverse grooves 78 of a wire pulling member N shown in Figures 22 and 35. The grooves 78 are complemental to the grooves 16 and therefore will receive any portion of the formed wire as it is transferred from the holding member G to the pulling or transferring member N. The member N is slidably mounted in a housing P which is rectangular in shape as shown in Figure 23 and is provided with guide eyelets 79 adjacent to its four corners. Figures 1, 2 and 17 illustrate how guide bolts 80 slidably receive the guide eyelets so that the housing can move vertically on the bolts. Springs 81 are mounted on the bolts 80 and are placed between the eyelets 79 and nuts 82. Figures 21 and 23 show the eyelets 79 provided with stop pins 83 that depend below the eyelets and normally contact with the uper surfaces of the members 10 and 10a due to the force of the springs 81.

Figure 34:
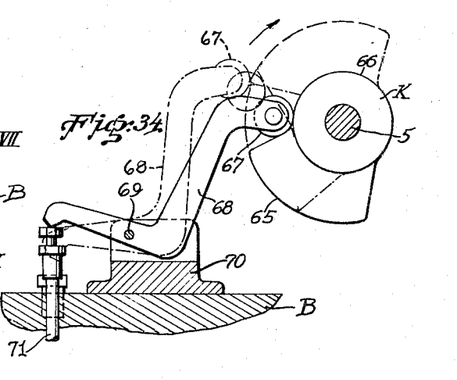
Figure 34 is similar to Figure 14, and shows the cam for operating the wire strand stripping fingers, advanced 180° from its starting position.

Figures 34 and 35 illustrate the actual lifting operation of the block 77. The cam K in Figure 34 is indicated in its 180° position by full lines and it is at this instant that the roller 67 is moved from the low portion 66 of the cam to the high portion 65. The lever 68 will be moved from the full to the dot dash line position and will raise the block 77 from the dot dash line position shown in Figure 35 to the full line position. This movement raises the wire E from the holding member G and transfers it to the wire-moving member N. Any number of loops E2 may be formed in the wire and the transferring from the member G to the member N will be effected by the raising of the block 77.

Figure 21 shows a bracket 84 with a keeper bar 85 secured thereto for holding the wire pulling member N from upward movement with respect to the housing P while still permitting longitudinal movement of the member N within the housing. The cam K has its high side 65 of sufficient length to permit the member N to be moved while the block 77 is holding the wire in the grooves 78 of the member N. Thus far in the operation of the machine I have only described the forming of the loop E2 by the die F and the removal of the loop from the die by the pins 62 and 63 which move quickly while the die F is in its extended loop-forming position. I have also described how the block 77 is moved upwardly by the cam K at about the same time as the cam J moves the pins upwardly for a short time. The cam K holds the block 77 in raised position while the wire moving member N acts on the wire.

*Means for actuating wire-moving member N*

The means for moving the member N is the cam M and the arrangement is such that the member N will be moved over the die F just prior to the time the pins 62 and 63 transfer the wire loop E2 from the die to the member N. Certain grooves 78 in the member N will register with the sides of the loop E2 formed by the die F and these grooves will receive the loop sides when the pins 62 and 63 lift the loop above the die. The member N then moves the loop E2 to the next position where it will be lined up with certain grooves 16 in the hold member G. At this point the holding member G receives the loop in its advanced position.

The cam M and its associate mechanisms is illustrated in Figures 9, 10 and 21 to 24, inclusive. The cam is mounted on the shaft 5 and rotates between two cam rollers 86 which in turn are carried by cross heads 87. The cross heads are mounted on parallel arms 88 that have their free ends connected to a member 89 which in turn is secured to the wire-moving member N. The arms 88, member 89 and wire-moving member N are clearly shown in perspective in Figure 22. In Figure 10 I show how a frame 90 carried by the top B has guides 91 in which the horizontal arms 88 are slidably disposed. The cam rollers 86 may be adjusted toward and away from each other in order to contact with diametrically opposite edge portions of the cam M.

The full line position of the cam M in Figure 9 shows it in its starting position. When the shaft 5 rotates 80°, the cam M is in the position M1 and the wire-moving member N has been moved to the left in Figure 9. Another 90° turn of the shaft will rotate the cam M to its M2 position where the wire moving member N will be at its extreme left-half position in Figure 9 and will have a portion overlie the die F which by this time has likewise been moved to its extreme loop-forming position. The cam J now actuates the pins 62 and 63 to lift the formed loop E2 off from the die F and move it into the registering grooves 78 of the member N. At the same time the block 77 is acted upon by its cam K and lifts any wire portion on the member G up into registering grooves of the member N. The cam K will hold the block 77 raised while the cam J will permit the pins 62 and 63 to drop in order that the die F can return.

The remaining 180° rotation of the cam M to complete its cycle will move the member N to the right so as to move the formed wire therewith and cause it to register with the next set of grooves 16 in the holding member G. The cam K will hold the block 77 in raised position from a position of about 235° from starting up to about 335° position. The block 77 will then be lowered by the springs 92 and the formed portion of the wire will be transferred from the grooves 78 in the pulling member N to the corresponding grooves 16 in the holding member G. During the return movement of the parts to starting position, the previously formed loop E2 has been stepped to the right in Figure 9 the distance equal to the width of one loop.

Loop crimping means

The loop E2 after being moved away from the die F by the member N is ready to be acted upon by a crimping mechanism which is actuated by the crimping cam L. This cam and associate mechanism is illustrated in Figures 11, 13, 31 and 32. The cam L in Figure 11 is mounted on the shaft 5 and the cam is in the full line position indicated at the starting position of the machine. The high point 93 of the cam is shown in a position ready to contact a cam roller 94 and swing a lever 95 from the position shown in Figure 11 into the position shown in Figure 31. The lever is pivoted at 96 to a bracket 97 that in turn is mounted on the top B.

A crimping lever 98 is pivoted at 99 to a bracket 100 that is mounted on one of the plates 8 adjacent to the point where the member N will move the loop E2 in two steps, the first step being to transfer the loop from the die F to the member G and the second step being to advance the loop to its next position on the member G. This position is clearly shown in Figures 13 and 33. A coil spring 101 has one end resting on the top B and held against lateral movement by a retaining member 102. The crimping lever 98 has a depending projection 102 that receives the upper end of the spring. The spring 101 holds the outer end of the lever 98 in contact with the lever 95.

The lever 98 has a toe portion 103 that normally underlies the closed end portion of the loop E2. The housing P has an anvil 104, see Figures 12, 13 and 23, that is positioned above the loop E2 when the toe 103 is positioned under the loop. When the high point 93 of the cam L engages the roller 94, see Figure 31, the lever 95 will swing the crimping lever 98 and cause the toe 103 to crimp the closed end of the loop E2 upwardly and against the anvil 104, see Figure 32. The resulting crimp in the loop E2 is illustrated at 105 in Figure 26. The crimping operation takes place during the first 90° rotation of the shaft 5 from its starting position. Each loop E2 is crimped in this manner.

The stepwise feeding of the wire E through the die F, forms the loops E1 as well as the loops E2, but it is only the loops E2 that have their portions 105 crimped. Figure 26 illustrates the loop E2 before and after crimping.

Operation

Figure 30:
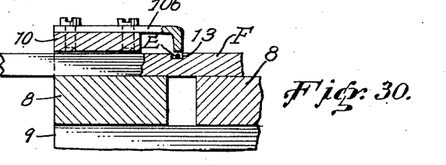
Figure 30 is an enlarged transverse section taken along the line XXX—XXX of Figure 27.
Figure 31:
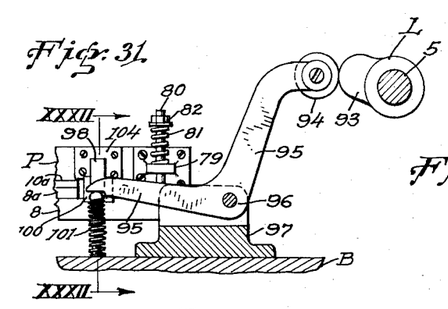
Figure 31 is a view similar to Figure 11 but shows a wire crimping cam rotated 90° beyond its starting position.

The wire E is initially fed along the groove 12 of the end die D, the groove 13 in the transverse die F, and the groove 14 formed in the upper edge of one of the side members of the block 77. Figures 27 and 30 illustrate the groove 13 in the die F being positioned under a keeper 106 when the die is in its starting position and the groove 13 is aligned with the groove 12 of the die D. The keeper prevents the wire from slipping out of the groove.

Figure 23 shows the housing P provided with a lip 107 at one end and Figures 9 and 17 show the lip overlying the die F to keep the wire in the die groove 13 while the die is moving to form the loop E2. The crankshaft rotates through 190° from its starting position to cause the die F to form the loop E2. At the same time the cam M moves the member N over the die F and at the proper moment the cam K causes the pins 62 and 63 to transfer the wire loop E2 from the die F to the pulling member N, the sides of the wire loop being received in the grooves 78 of the member N.

The member N moves the loop E2 one step away from the die F while the crankshaft 5 completes the second half of its first revolution. The slot 31 in the pitman 28, see Figure 28, permits the die F to remain in moved position while the pins 62 and 63 strip the loop E2 from the die. The formed loop E2 that has been moved off from the die F by the pins 62 and 63 and moved away from the die by the member N, is transferred to the holding member G at the end of the first revolution of the crank shaft.

During the 180° movement of the second revolution of the crank-shaft, a second loop E2 is formed by the die F, and this is lifted off from the die by the pins 62 and 63 and transferred to the member N which again has been moved over by the cam M to receive the second loop. At about the same time, the cam K causes the block 77 to raise and move the first loop E2 into registering grooves 78 in the member N. The cam K holds the block K in raised position during the return movement of the member N. Two loops E2 have now been formed and the machine is ready to form the third loop E2.

Figure 32:
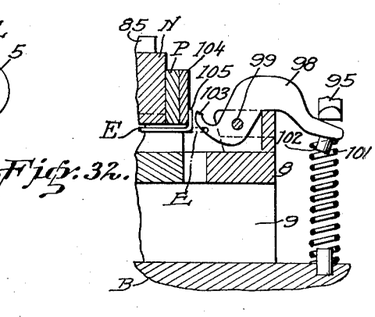
Figure 32 is a vertical section taken along the line XXXII—XXXII of Figure 31 and is similar to Figure 12, but showing the crimping action completed after the crimping cam has moved 90° from its starting position.

The first 90° rotation of the crank-shaft on its third revolution causes the crimping cam L to actuate the crimping lever 98 and cause the toe 103 to crimp the end of the loop E2 as shown in Figures 26 and 32, the first loop E2 having by this time reached the position where the crimping lever can act on it. The first half of the third revolution causes the die F to form a third loop E2. The adjacent loops are interconnected by the loops E1. The cams J and K actuate wire stripping mechanisms to remove the wire from the die F and the holding member G and transfer it to the member N which has been moved by its cam N to its furtherest position. The member N then moves the formed wire one step and returns it to the member G.

These series of operations take place automatically for each revolution of the crank-shaft 5 and in proper sequence. The completely formed wire strand is fed from the machine loop by loop and will look like that shown in Figure 26. In forming the screen as shown in Figure 40, the loops E2 of one wire strand are connected to the loops E1 of the adjacent wire strand. As many of these strands as desired may be interconnected to form a screen of the proper size. It is possible to make a wire belt from the strands as shown in my copending application above referred to.

I claim:

1. In a wire-shaping machine, a stationary die having a groove associated therewith for receiving a wire, a moveable die having a wire receiving groove therein registering with the first-named groove when the moveable die is in normal position, means for moving the moveable die transversely to the wire and toward the stationary die, a second moveable die having a groove registering with the other two grooves for receiving the wire, means for moving both moveable dies so that the transversely moving die will form a loop in the wire and the stationary die and other moveable die will cooperate with the transversely moving die to form a loop with a closed end and inwardly inclined sides, means for lifting the formed loop above the transversely moveable die, means for moving the raised loop toward and over the stationary die, a loop retaining member placed adjacent to the stationary die and having grooves for receiving the loop that has been advanced by the last-named loop moving means, the loop moving means being returned in its movement to overlie the transverse die during the latter's movement to form the next loop, additional loop-lifting means actuated with the first-named loop lifting means for freeing the section of formed loops from the loop retaining member and for temporarily connecting the formed loops with said last-named loop moving means, whereby the formed loops will be advanced to a position where another loop can be formed by the transversely moveable die, means for returning the formed loop section to the loop retaining member when said last-named loop moving means has advanced the loop section to a position to permit another loop to be formed, and means for raising the closed end of the loops into a position above the plane of the loops.

2. In a wire-shaping machine, a stationary die having a wire-receiving groove associated therewith and wire-shaping edges making an acute angle with said groove, a transversely moveable die having a groove normally aligned with the wire-receiving groove and having tapered sides, one of which cooperates with the wire-shaping edge of the stationary die when the transversely moveable die has moved to the limit of its travel in one direction and has formed a loop in the wire, a longitudinally moveable die moveable in the direction of the length of the wire and having a wire-receiving groove therein for receiving the wire, the longitudinally moveable die having a wire-shaping edge making an acute angle with the groove in the die, the wire-shaping edge of the longitudinally moving die cooperating with the other tapered side of the transversely moveable die when both moveable dies have moved to the limit of their travel in one direction, means for lifting the loop from the transverse die, means for moving the lifted loop in the direction of the length of the wire a distance equal to the width of the loop, means for moving the dies, loop-lifting means and loop moving means in proper sequence to form the wire into a plurality of similar loops in which the adjacent loops extend in opposite directions, a loop-receiving member placed near the stationary die and adapted to receive the formed loop that is moved by the loop moving means which moves the loop in the direction of the wire, and means associated with the loop moving means for transferring the formed loop to the loop receiving member.

3. In a wire-shaping machine, means for stepwise feeding a wire in the direction of its length, a stationary die having an inclined wire-shaping edge, a transversely-moveable wedge-shaped die having wire-shaping edges lying in the same plane and converging toward one end of that die and diverging toward the opposite end thereof, means for moving said moveable die transversely to the wire and at the same time moving one of its wire-shaping edges toward the inclined edge of the stationary die, the transversely-moveable die having a loop-forming portion lying parallel to the line of wire travel and having one of its wire-shaping edges cooperating with the inclined edge of the stationary die to press one side of the loop into inclined relation to the wire, a second moveable die having an inclined wire-shaping edge inclined opposite to the inclined edge of the stationary die and paralleling and cooperating with the other wire-shaping edge of the transversely-moveable die for pressing the other side of the loop into inclined relation to the wire, the sides of the loop diverging from each other from the open to the closed ends of the loop, means for moving both moveable dies toward the stationary die to form the loop, and means for lifting the loop from the wedge-shaped die just prior to said first-named means advancing the wire one step.

4. In a wire-shaping machine, means for stepwise feeding a wire in the direction of its length, a stationary die having an inclined wire-shaping edge, a transversely-moveable wedge-shaped die having wire-shaping edges lying in the same plane and converging toward one end of that die and diverging toward the opposite end thereof, means for moving said moveable die transversely to the wire and at the same time moving one of its wire-shaping edges parallel to and toward the inclined edge of the stationary die, the transversely-moveable die having a loop-forming portion lying parallel to the line of wire travel and having one of its wire-shaping edges cooperating with the inclined edge of the stationary die to press one side of the loop into inclined relation to the wire, a second moveable die having an inclined wire-shaping edge inclined opposite to the inclined edge of the stationary die and paralleling and cooperating with the other wire-shaping edge of the transversely-moveable die for pressing the other side of the loop into inclined relation to the wire, the sides of the loop diverging from each other from the open to the closed ends of the loop, means for moving both moveable dies toward the stationary die to form the loop, means for lifting the loop from the wedge-shaped die just prior to said first-named means advancing the wire one step and means for crimping the portions of the loop adjacent to the closed end for moving the closed end out of the plane of the loop.

5. In a wire-shaping machine, means for holding spaced portions of a wire, a wedge-shaped die moveable transversely to the length of the wire and with its plane paralleling the wire length and between the spaced holding means, the die engaging with the wire to bend it into an open-ended loop whose plane parallels the plane of the die, a stationary die having inclined grooves for receiving the sides of the loop and a set of grooves associated therewith for receiving the looped portions of the wire, a second moveable die, means for moving the two moveable dies for causing the stationary and the second-named moveable dies to press the wire loop about the transversely-moveable die, the dies having co-operating wire-shaping edges to press the sides of the loop into diverging relation with one another from the open to the closed ends of the loop, means for lifting the formed loop from the transversely-moveable die in a direction at right angles to the plane of the loop, and means for advancing the lifted loop in the direction of the length of the wire and into registration with the other transversely-inclined grooves and the grooves associated with the stationary die, the loop-lifting means being retractable for transferring the advanced loop to the registering grooves.

6. In a wire-shaping machine, means for holding spaced portions of a wire, a wedge-shaped die moveable transversely to the length of the wire and with its plane paralleling the wire length and between the spaced holding means, the die engaging with the wire to bend it into an open-ended loop whose plane parallels the plane of the die, a stationary die having inclined grooves for receiving the sides of the loop and a set of grooves associated therewith for receiving the looped portions of the wire, a second moveable die, means for moving the two moveable dies for causing the stationary and the second-named moveable dies to press the wire loop about the transversely-moveable die, the dies having co-operating wire-shaping edges to press the sides of the loop into diverging relation with one another from the open to the closed ends of the loop, means for lifting the formed loop from the transversely-moveable die in a direction at right angles to the plane of the loop, means for advancing the lifted loop in the direction of the length of the wire and into registration with the other transversely-inclined grooves and the grooves associated with the stationary die, the loop-lifting means being retractable for transferring the advanced loop to the registering grooves, and means for bending the closed end of the loop while the loop is confined in the grooves so that the closed end will lie out of the plane of the loop.

7. In a wire-shaping machine, a stationary die having a groove associated therewith for receiving a wire and also having an inclined wire-shaping edge, a transversely moveable wedge-shaped die having a wire-receiving groove therein registering with the first-named groove when the moveable die is in normal position, said moveable die having wire-shaping edges converging toward one end of that die and diverging toward the opposite end thereof, means for moving the moveable die transversely to the wire with one of its wire-shaping edges moving toward the inclined edge of the stationary die, a second moveable die having a groove registering with the other two grooves for receiving the wire, the second moveable die having an inclined wire-shaping edge inclined opposite to the inclined edge of the stationary die and paralleling and cooperating with the other wire-shaping edge of the transversely-moveable die, the moveable dies being moveable so that the transversely-moving die will form a loop in the wire, and the stationary die and other moveable die will cooperate with the transversely-moving die to form the loop with a closed end and sides diverging relative to one another from the open to the closed ends of the loop, and means for lifting the formed loop above the transversely-moveable die to clear the formed loop therefrom.

8. In a wire-shaping machine, a stationary die having a groove associated therewith for receiving a wire and also having an inclined wire-shaping edge, a transversely moveable wedge-shaped die having a wire-receiving groove therein registering with the first-named groove when the moveable die is in normal position, said moveable die having wire-shaping edges converging toward one end of that die and diverging toward the opposite end thereof, means for moving the movable die transversely to the wire with one of its wire-shaping edges moving toward the inclined edge of the stationary die, a second moveable die having a groove registering with the other two grooves for receiving the wire, the second moveab'e die having an inclined wire-shaping edge inclined opposite to the inclined edge of the stationary die and paralleling and cooperating with the other wire-shaping edge of the transversely-moveable die, the moveable dies being moveable so that the transversely-moving die will form a loop in the wire, and the stationary die and other moveable die will cooperate with the transversely-moving die to form the loop with a closed end and sides diverging relative to one another from the open to the closed ends of the loop, means for lifting the formed loop above the transversely-movable die to clear the formed loop therefrom, means for advancing the raised loop over the stationary die, and a loop-retaining member placed adjacent to the stationary die and having grooves for receiving the loop that has been advanced by the loop-advancing means.

9. In a wire-shaping machine, a stationary die having an inclined edge and a groove associated therewith for receiving a wire, a wedge-shaped moveable die having a wire receiving groove therein registering with the first-named groove when the moveable die is in normal position, means for moving the moveable die transversely to the wire and toward the stationary die, a second moveable die having an inclined edge and a groove normally registering with the other two grooves for receiving the wire, the wedge-shaped die having its sides disposed opposite and paralleling the adjacent inclined edges of the stationary and second movable dies, means for moving both moveable dies so that the transversely moving die will form a loop in the wire and the stationary die and the other moveable die will cooperate with the transversely moving die to form a loop with a closed end and inwardly inclined sides, means for lifting the formed loop above the transversely moveable die, means for moving the raised loop toward and over the stationary die, a loop retaining member placed adjacent to the stationary die and having grooves for receiving the loop that has been advanced by the last-named loop moving means, the loop moving means being returned in its movement to overlie the transverse die during the latter's movement to form the next loop, additional loop-lifting means actuated with the first-named loop lifting means for freeing the section of formed loops from the loop retaining member and for temporarily connecting the formed loops with said last-named loop moving means, whereby the formed loops will be advanced to a position where another loop can be formed by the transversely moveable die, and means for returning the formed loop section to the loop-retaining member when said last-named loop moving means has advanced the loop section to a position to permit another loop to be formed.

10. In a wire-shaping machine, a stationary die having a wire-receiving groove associated therewith and a wire-shaping edge making an acute angle with the groove, a transversely-moveable die having a groove normally aligned with said wire-receiving groove and having tapered sides, one side of which parallels the wire-shaping edge of the stationary die at all times and cooperates therewith in forming an inclined side of a loop when the transversely-moveable die has moved to the limit of its travel in one direction and has formed a closed end loop in the wire, a longitudinally-moveable die moveable in the direction of the length of the wire and having a wire-receiving groove therein for receiving the wire, the longitudinally-moveable die having a wire-shaping edge making an acute angle with the groove in that die, the wire-shaping edge of the longitudinally-moving die paralleling the other tapered side of the transversely-moveable die at all times and cooperates therewith in forming an inclined side of the loop when both moveable dies have moved to the limit of their travel in one direction, the wire-shaping edges of the stationary and longitudinally-moving dies being inclined in opposite directions relative to one another, whereby the sides of the loop will diverge with respect to each other from the open to the closed end of the loop, means for lifting the loop from the transverse die, means for moving the lifted loop in the direction of the length of the wire a distance equal to the width of the loop; and means for moving the dies, loop-lifting means and loop-moving means in proper sequence to form the wire into a plurality of similar loops in which the adjacent loops extend in opposite directions.

11. In a wire-shaping machine, a stationary die having a wire-receiving groove associated therewith and a wire-shaping edge making an acute angle with the groove, a transversely-moveable die having a groove normally aligned with said wire-receiving groove and having tapered sides, one side of which parallels the wire-shaping edge of the stationary die at all times and cooperates therewith in forming an inclined side of a loop when the transversely-moveable die has moved to the limit of its travel in one direction and has formed a closed end loop in the wire, a longitudinally-moveable die moveable in the direction of the length of the wire and having a wire-receiving groove therein for receiving the wire, the longitudinally-moveable die having a wire-shaping edge making an acute angle with the groove in that die, the wire-shaping edge of the longitudinally-moving die paralleling the other tapered side of the transversely-moveable die at all times and cooperates therewith in forming an inclined side of the loop when both moveable dies have moved to the limit of their travel in one direction, the wire-shaping edges of the stationary and longitudinally-moving dies being inclined in opposite directions relative to one another, whereby the sides of the loop will diverge with respect to each other from the open to the closed end of the loop, means for lifting the loop from the transverse die, means for moving the lifted loop in the direction of the length of the wire a distance equal to the width of the loop; and means for moving the dies, loop-lifting means and loop-moving means in proper sequence to form the wire into a plurality of similar loops in which the adjacent loops extend in opposite directions; and means for successively raising the closed ends of alternate loops after the loops have been freed from the transversely-moving die so that these ends will extend above the plane of the loops.

12. In a wire-shaping machine; spaced apart movable and stationary wire-shaping members having their adjacent ends inclined with respect to each other; a wedge-shaped die movable transversely in the space provided between the members and having its wedge-shaped sides disposed opposite and paralleling the adjacent inclined ends of the wire-shaping members; means for moving the wedge-shaped die and the movable wire-shaping member toward the stationary member for causing the die and the two members to cooperate and form a loop in the wire with the sides of the loop diverging relative to one another from the open to the closed end of the loop; means for lifting the formed loop from the die; said stationary member having a loop receiving portion with grooves shaped for receiving the formed loop; a loop moving member for receiving the loop freed from the die by the loop removing means and for moving the loop to a position above the loop retaining portion and in registration with the grooves; and means for transferring the loop from the said loop moving member to the loop receiving portion.

13. In a wire-shaping machine; spaced apart movable and stationary wire-shaping members having their adjacent ends inclined with respect to each other; a wedge-shaped die movable transversely in the space provided between the members and having its wedge-shaped sides disposed opposite and paralleling the adjacent inclined ends of the wire-shaping members; means for moving the wedge-shaped die and the movable wire-shaping member toward the stationary member for causing the die and the two members to cooperate and form a loop in the wire with the sides of the loop diverging relative to one another from the open to the closed end of the loop; means for lifting the formed loop from the die; said stationary member having a loop receiving portion with grooves shaped for receiving the formed loop; a loop moving member for receiving the loop freed from the die by the loop removing means and for moving the loop to a position above the loop retaining portion and in registration with the grooves; means for transferring the loop from the said loop moving member to the loop receiving portion; an auxiliary loop removing means for lifting the formed loops from the loop receiving portion when the loop lifting means removes the loop from the die; and means for actuating both the loop lifting means and the auxiliary loop removing means simultaneously and for returning the loop lifting means to starting position to permit the die to return to starting position.

14. In a wire-shaping machine; spaced apart movable and stationary wire-shaping members having their adjacent ends inclined with respect to each other; a wedge-shaped die movable transversely in the space provided between the members and having its wedge-shaped sides disposed opposite and paralleling the adjacent inclined ends of the wire-shaping members; means for moving the wedge-shaped die and the movable wire-shaping member toward the stationary member for causing the die and the two members to cooperate and form a loop in the wire with the sides of the loop diverging relative to one another from the open to the closed end of the loop; means for lifting the formed loop from the die; said stationary member having a loop receiving portion with grooves shaped for receiving the formed loop; a loop moving member for receiving the loop freed from the die by the loop removing means and for moving the loop to a position above the loop retaining portion and in registration with the grooves; means for transferring the loop from the said loop moving member to the loop receiving portion; an auxiliary loop removing means for lifting the formed loops from the loop receiving portion when the loop lifting means removes the loop from the die; means for actuating both the loop lifting means and the auxiliary loop removing means simultaneously and for returning the loop lifting means to starting position to permit the die to return to starting position; said loop moving member receiving the loop from the die and the formed loops from the loop receiving portion; the loop moving member moving the formed loop into an advanced position with respect to the loop receiving portion; whereupon the loop transferring means will remove the loops from the loop moving member to the loop receiving portion when the auxiliary loop removing means returns to starting position.

15. In a wire-shaping machine; spaced apart movable and stationary wire-shaping members having their adjacent ends inclined with respect to each other; a wedge-shaped die movable transversely in the space provided between the members and having its wedge-shaped sides disposed opposite and paralleling the adjacent inclined ends of the wire-shaping members; means for moving the wedge-shaped die and the movable wire-shaping member toward the stationary member for causing the die and the two members to cooperate and form a loop in the wire with the sides of the loop diverging relative to one another from the open to the closed end of the loop; means for lifting the formed loop from the die; said stationary member having a loop receiving portion with grooves shaped for receiving the formed loop; a loop forming member for receiving the loop freed from the die by the loop removing means and for moving the loop to a position above the loop retaining portion and in registration with the grooves; means for transferring the loop from the said loop moving member to the loop receiving portion, and means for crimping the closed end of the loop for positioning this end above the plane of the loops.

16. In a wire-shaping machine; spaced apart movable and stationary wire-shaping members having their adjacent ends inclined with respect to each other; a wedge-shaped die movable transversely in the space provided between the members and having its wedge-shaped sides disposed opposite and paralleling the adjacent inclined ends of the wire-shaping members; means for moving the wedge-shaped die and the movable wire-shaping member toward the stationary member for causing the die and the two members to cooperate and form a loop in the wire with the sides of the loop diverging relative to one another from the open to the closed end of the loop; means for lifting the formed loop from the die; said stationary member having a loop receiving portion with grooves shaped for receiving the formed loop; a loop moving member for receiving the loop freed from the die by the loop removing means and for moving the loop to a position above the loop retaining portion and in registration with the grooves; means for transferring the loop from the said loop moving member to the loop receiving portion; an auxiliary loop removing means for lifting the formed loops from the loop receiving portion when the loop lifting means removes the loop from the die; means for actuating both the loop lifting means and the auxiliary loop removing means simultaneously and for returning the loop lifting means to starting position to permit the die to return to starting position; said loop moving member receiving the loop from the die and the formed loops from the loop receiving portion; the loop moving member moving the formed loop into an advanced position with respect to the loop receiving portion; whereupon the loop transferring means will remove the loops from the loop moving member to the loop receiving portion when the auxiliary loop removing means returns to starting position, said loop transferring means being spring actuated for effecting the transfer as the auxiliary loop removing means returns to starting position.

FLORIAN F. DAUENHAUER.

REFERENCES CITED

The following references are of record in the file of this patent:

UNITED STATES PATENTS

| Number | Name | Date |
| --- | --- | --- |
| 456,533 | Bold | July 21, 1891 |
| 795,214 | Flowers | July 18, 1905 |
| 1,031,599 | Todd | July 2, 1912 |
| 1,122,092 | Fedders | Dec. 22, 1914 |
| 1,337,504 | Bloemaker | Apr. 20, 1920 |
| 1,561,594 | Civis | Nov. 17, 1925 |
| 2,397,502 | Watt | Apr. 2, 1946 |